United States Patent [19]
Sato et al.

[11] Patent Number: 5,919,719
[45] Date of Patent: Jul. 6, 1999

[54] SILICON NITRIDE SINTERED BODY

[75] Inventors: Masahiro Sato; Katsushi Sakaue; Takero Fukudome, all of Kokubu, Japan

[73] Assignee: Kyocera Corporation, Kyoto, Japan

[21] Appl. No.: 09/141,451

[22] Filed: Aug. 27, 1998

[30] Foreign Application Priority Data

Aug. 29, 1997 [JP] Japan ..................... 9-234632

[51] Int. Cl.⁶ ................................. C04B 35/587
[52] U.S. Cl. ............................................. 501/97.2
[58] Field of Search ................... 501/97.2, 97.1

[56] References Cited

U.S. PATENT DOCUMENTS 4,891,342  1/1990  Yokoyama ............... 501/97.2
4,944,930  7/1990  Holt et al. ............... 501/97.1
5,126,294  6/1992  Hirosaki et al. ......... 501/97.2
5,756,411  5/1998  Nakahata et al. ....... 501/97.1

*Primary Examiner*—Karl Group
*Attorney, Agent, or Firm*—Loeb & Loeb LLP

[57] ABSTRACT

A silicon nitride sintered body containing a β-silicon nitride crystal phase and further containing at least a rare earth element component and an aluminium component in a grain boundary phase, wherein the intensity ratio (X2/X1) of the Si peak $X_2$ at 521 cm$^{-1}$ to the $Si_3N_4$ peak $X_1$ at 206 cm$^{-1}$, as detected by a Raman spectrochemical analysis method, is 0.2 to 3. A very minor amount of Si (elemental silicon), as detected by the Raman spectrochemical analysis method, is precipitated in the sintered body, and by this precipitation of Si, strength and toughness are markedly increased.

4 Claims, 1 Drawing Sheet

SILICON NITRIDE SINTERED BODY

BACKGROUND OF THE INVENTION

1. Field of the Invention

This invention relates to a silicon nitride sintered body having excellent properties such as toughness and strength, and more specifically, relates to a silicon nitride sintered body used as automotive parts such as piston pins or engine valves, as gas turbine engine parts and as a drive shaft of a fuel jetting pump shaft, a plunger, a washer, a container for a pulverizing machine, a lining material and a media of communication.

2. Description of the Prior Art

It is known that a silicon nitride sintered body has excellent properties such as heat resistance, thermal shock resistance, and oxidation resistance, and investigations as engineering ceramics used in heat engines such as a turborotor have been conducted.

As such silicon nitride sintered bodies, a ternary-type sintered body composed of $Si_3N_4$-rare earth element oxide-$SiO_2$ is known. In this sintered body, various crystal phases having excellent high temperature characteristics are precipitated in a grain boundary. Accordingly, this sintered body has excellent strength at a high temperature and excellent oxidation resistance at a high temperature. However, to obtain this ternary-type sintered body, it is necessary to fire the starting material at a high temperature of at least 1900° C. while suppressing the decomposition of $Si_3N_4$, and moreover, it is necessary to use a special and expensive firing furnace. As a result, the sintered body has a defect that the production cost is very high.

To increase the sinterability, it is also known to add rare earth element oxides such as $Y_2O_3$ or oxides such as $Al_2O_3$ and MgO to a silicon nitride powder and to fire this mixed powder. Especially when a rare earth oxide and $Al_2O_3$ are used, since they can be fired at a low temperature and under a normal pressure, the sintered body can be formed at a low cost. However, when $Al_2O_3$ is used, a low melting point compound is easily formed in a grain boundary of silicon nitride crystal. Accordingly, there is a defect that the resulting silicon nitride sintered body has a low strength at a high temperature.

The resulting silicon nitride sintered body has a high strength, but its toughness is as low as 5 MPa.m$^{1/2}$, and its toughness should desirably be increased. As a method of increasing the toughness, it has been proposed that the atmosphere or the temperature at the time of firing is controlled to controll the shape of a columnar crystal composed cf silicon nitride, or particles or a fibrous product composed of silicon carbide is mixed with a starting powder to obtain the sintered body which has a complex structure. However, since in the method of controlling the shape of a silicon nitride crystal by the firing atmosphere or the firing temperature, the firing conditions change in accordance with the characteristics of the starting material, it is difficult to produce a sintered body having fixed properties stably, and there is a problem of mass producibility. Furthermore, a method of using a compound of silicon carbide makes it possible to increase toughness to some degree, but excellent characteristics which a silicon nitride sintered body possesses are impaired. Furthermore, sinterability will be lowered and it is necessary to improve sinterability.

SUMMARY OF THE INVENTION

It is an object of this invention to provide a silicon nitride sintered body which has high strength at room temperature and a high temperature, and high toughness, and which can be produced at a low cost.

As a result of repeating investigations on a silicon nitride sintered body, the inventors have found that in a silicon nitride sintered body obtained by mixing an oxide of a rare earth element such as yttrium (Y) and $Al_2O_3$ with a silicon nitride powder and firing the mixture, by precipitating Si (elemental silicon) in the tissue of sintered body, strength at a high temperature and toughness can be increased, and thus the present invention has been completed.

According to this invention, there is provided a sintered body containing a β-silicon nitride crystal phase as a main crystal phase and containing a rare earth elemental component and an aluminium component in a grain boundary, wherein the intensity ratio $(X_2/X_1)$ of a Si peak $X_2$ at 521 cm$^{-1}$ to a silicon nitride peak $X_1$ at 206 cm$^{-1}$ detected by a Raman spectrochemical analysis method is 0.2 to 3.

DETAILED DESCRIPTION OF THE INVENTION

Figure 1:
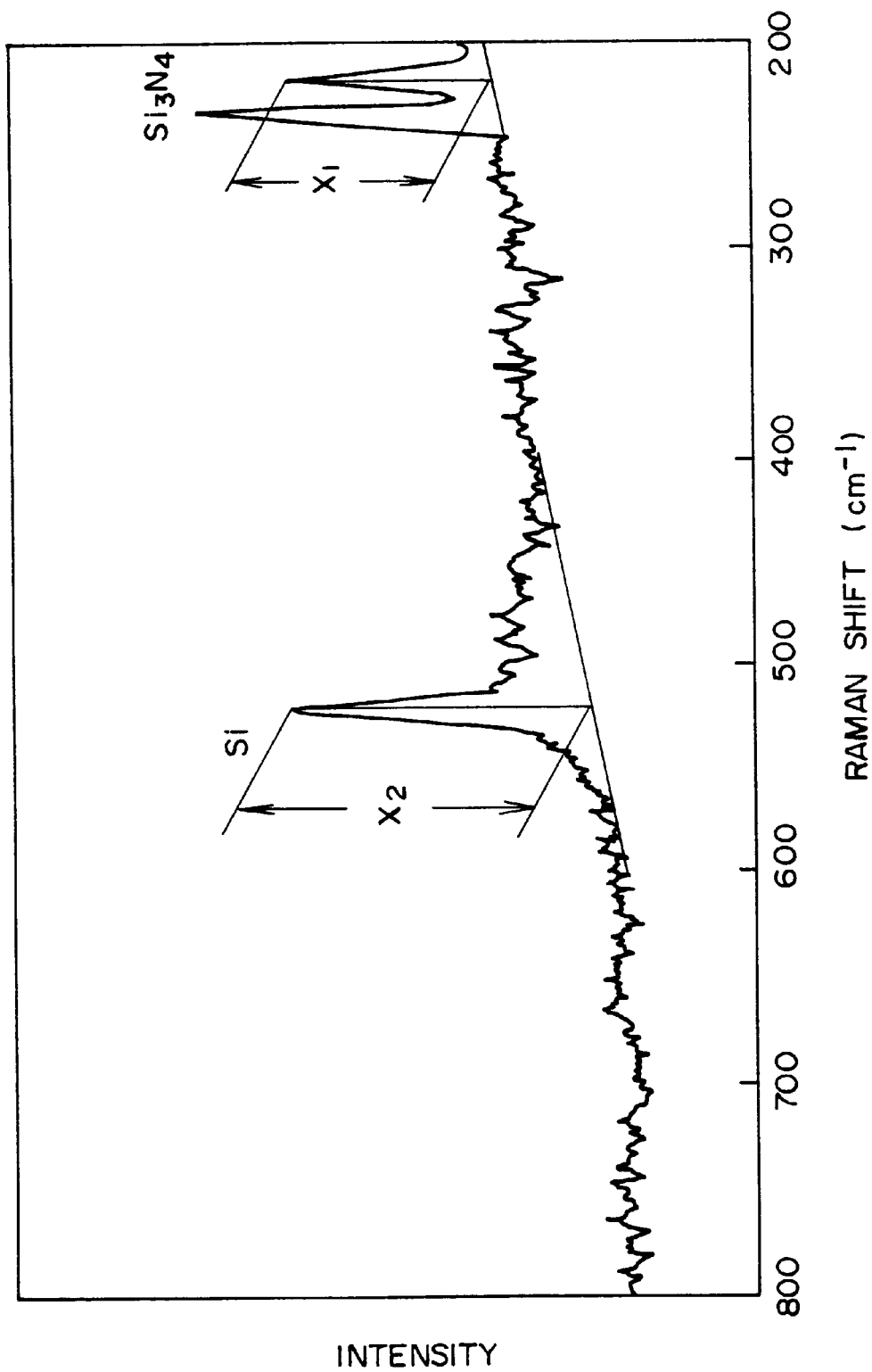
FIG. 1 shows a Raman spectrochemical analysis chart of a silicon nitride sintered body of the present invention (sample No. 8) produced by an Example shown below.

In the present invention, it is very important that a very minor amount of Si (elemental silicon) should be precipitated in the tissue of the silicon nitride sintered body. The Si cannot be observed by a scanning electron microscope (SEM), it is as slight as cannot be detected by an X-ray diffraction method. The Si is present on very minor level and it can be detected only by a Raman spectrochemical analyzing method. Specifically, referring to a Raman spectrochemical analysis chart of the silicon nitride sintered body of this invention shown in FIG. 1, the intensity ratio $(X_2/X_1)$ of the Si peak $X_2$ at 521 cm$^{-1}$ to the silicon nitride (β-$Si_3N_4$) peak $X_1$ at 206 cm$^{-1}$ is 0.2 to 3, especially 1 to 2. By precipitating such a minor amount of Si, the sintered body of this invention has a strength at room temperature of at least 1000 MPa, and a strength at 1000° C. of at least 800 MPa, and an excellent breaking toughness value (KIc) of at least 6 MPa.m$^{1/2}$. The Si peak at 521 cm$^{-1}$ in the Raman spectrochemical analysis shows the presence of Si-Si bonding. It is presumed to be present as a metal phase. Since the above-mentioned minor amount of Si is not observed by an electron microscope in this invention, the reason why the strength or toughness of the sintered body increases by the above minor amount of Si has not been elucidated clearly. However, from the fact that the strength or toughness of the sintered body is increased, Si is dispersed in at least a grain boundary, and it is presumed that Si dispersed in the grain boundary acts to obstruct the development of cracks.

In this invention, it is important that the amount of Si precipitated is very minor. If the peak intensity ratio $(X_2/X_1)$ is larger than the above range, for example, when Si is present in an amount on a level detected by an X-ray diffraction method, Si becomes a source of destruction, and the strength of the sintered body is decreased. If the peak intensity ratio $(X_2/X_1)$ is smaller than the above range, the increasing effect of the strength or toughness is low, and the desired characteristics cannot be obtained.

In the present invention, the main crystal phase is composed of β-silicon nitride, and this β-silicon nitride crystal phase is present as a columnar crystal having an average aspect ratio of at least 3 and a minor axis diameter of 0.5 to 2 μm.

In the grain boundary of the above crystal phase, the rare earth elemental component and the aluminum component are present as a compound such as an oxide or an oxynitride. The rare earth elements and aluminum component are derived from rare earth element oxides and $Al_2O_3$ used as a sintering aid, and are present as a component for forming a glass phase or a crystal phase. For example, the rare earth elements react with $A_2O_3$ derived from the sintering aids, $SiO_2$ or $Si_3N_4$ dissolved in a grain boundary and may be present as rare earth element oxides-$Si_3N_4$—$SiO_2$ type crystal phase (apatite, wollastonite, YAM), rare earth element oxides-$SiO_2$ type crystal phase (disilicate, monosilicate), and eare earth element oxides-$Al_2O_3$ type crystal phase (YAG, YAP). A part of aluminum may be dissolved in a β-silicon nitride crystal phase to form SIALON. Furthermore, as examples of rare earth elements, Y, Er, Yb, Lu and Sm may be exemplified. Y is preferred from a stand point that the amount exists in a mineral.

In the sintered body of this invention, the rare earth elements may be contained in an amount of 2 to 8 mole %, especially in an amount of 3 to 7 mole %, calculated as an oxide. The aluminum may preferably be contained in an amount of 1 to 5 mole %, especially in an amount of 2 to 4 mole %, calculated as an oxide. If the rare earth elements and aluminum derived from sintering aids are less than the above ranges, the liquid phase is insufficient in the firing step, it is impossible to obtain a dense sintered body, and the strength of the sintered body is reduced. If the contents of these elements are larger than the above range, the amounts of liquid phases formed in the firing step become excessive. Therefore, an abnormal grain growth of silicon nitride occurs, and the grown abnormal grains become a source of destruction and the strength of the sintered body is reduced. Furthermore, silicon nitride is decomposed violently on the surface layer of the molded article to be sintered, and for this reason, the sintered body is reduced in strength.

It is preferred that in the sintered body of this invention, the excessive oxygen content calculated as $SiO_2$ should be 2 to 8 mole %, especially 3 to 7 mole %. This excessive oxygen content corresponds to the amount which is obtained by subtracting the amount of oxygen contained in the oxides of the rare earth elements and $Al_2O_3$ from the total amount of oxygen in the sintered body. It is composed of oxygen contained in the starting silicon nitride powder as an inevitable impurity, and oxygen derived from the $SiO_2$ powder added as required. By using $SiO_2$ as a filler so that the excessive oxygen content comes within the above range, characteristics such as strength can be further increased. For example, when the excessive oxygen content is contained in a larger amount than that specified in the above range, the amount of liquid phase in the firing step becomes insufficient, and as stated above, the strength of the sintered body becomes lower.

By including 8 parts by weight or less of at least one element selected from Mg, W, Mo, Cu and Fe in addition to the rare earth elements or aluminium as an oxide, a nitride, an oxynitride or silicide per 100 parts by weight of the silicon nitride, the rare earth element oxide, aluminum oxide and excessive oxygen (calculated as silicon oxide) in the silicon nitride sintered body of this invention, sinterability is increased and densification is promoted to improve the characteristics further. When these compounds are included, the excessive amount of oxygen is obtained by subtracting further the oxygen contained in these compounds from the entire oxygen amount.

(Production of the sintered body)

In producing the silicon nitride sintered body of this invention, the rare earth element oxides and $Al_2O_3$ powder as sintering aids are mixed with silicon nitride powder, and as required, $SiO_2$ powder as a filler is mixed. The resulting powder is used as a starting powder. As required, at least one element selected from Mg, W, Mo, Cu and Fe may be mixed with a powder of an oxide, a nitride, an oxynitride or a silicide.

The silicon nitride powder may be any type of silicon nitride powder such as α-$Si_3N_4$ or β-$Si_3N_4$. But in increasing sinterability, α-conversion ratio of this silicon nitride powder should be preferably at least 90%. By firing α-$Si_3N_4$, all α-$Si_3N_4$ is phase-transformed to β-$Si_3N_4$. The silicon nitride powder has an average particle diameter of 0.4 to 1.2 μm. The amount of impurity oxygen should be preferably within a range of 0.5 to 1.5% by weight.

Each oxide powder to be mixed with silicon nitride powder should be such that the rare earth elements, the aluminum component, and the excessive oxygen content may be in the ranges specified above.

An organic binder is added to the so obtained mixed powder and the mixture is then molded into a desired shape by a known molding method such as press forming, cast molding, extrusion molding, injection molding and cold hydrostatic pressure molding.

It is very important that in this invention, in a nitrogen atmosphere containing SiO, the above molded product is fired at normal pressure at 1700 to 1800° C., especially 1730 to 1780° C. for about 1 to 8 hours. By performing firing under these conditions, the silicon nitride is decomposed to precipitate a minor amount of Si (elemental silicon) in the sintered body and it is possible to obtain a sintered body having a high strength and a high toughness. In this case, nitrogen gas generated by decomposition is volatilized into the atmosphere. When the firing is performed in an atmosphere containing no SiO, or it is performed at a temperature higher than 1800° C., the decomposition of silicon nitride becomes violent, and the minor amount of silicon nitride alone cannot be decomposed. As a result, the peak intensity ratio due to the Raman spectrochemical analysis greately exceeds a predetermined range, and the strength of the sintered body is decreased very much. Furthermore, when the firing is carried out at a temperature lower than 1700° C., it is difficult to sinter the molded article effectively. Thus, the precipitation of Si (elemental silicon) cannot be desired, and it is impossible to produce a sintered body having increased strength and toughness.

An atomosphere containing SiO can be formed by firing the molded product which is placed into a firing pot together with a mixed powder of $SiO_2$+Si ($SiO_2$:Si=1:1 mole ratio) or $SiO_2$+$Si_3N_4$ ($SiO_2$:$Si_3N_4$=3:1 mole ratio). The concentration of SiO in this atmosphere is one great cause of determining the amount of Si to be precipitated. Specifically, per liter of the inner capacity of the firing pot in which the molded product is accommodated, 1 to 10 g, especially 3 to 8 g, of the $SiO_2$+Si mixed powder or 1.3 to 13 g, especially 4 to 10 g, of the $SiO_2$+$Si_3N_4$ mixed powder should desirably placed. If the amounts of these powders are smaller than the above range, the precipitation of Si abruptly proceeded, and it is difficult to adjust the amount of Si to the amount of level mentioned above. If the amount of Si is larger than the above range, sinterability is hampered. The amount of Si precipitated can be controlled by controlling the atmosphere and simultaneouly by controlling the firing time.

According to this invention, after the above firing is carried out at normal pressure, hot isostatic pressure firing can be performed to obtain a sintered body which is further densified. This hot isostatic pressure firing can be carried out in an inert gaseous atmosphere such as nitrogen gas, or argon gas at a pressure of 1000 to 2000 atms. But the firing temperature is lower than the previous norml pressure firing, for example, at 1600 to 1800° C. so that the amount of Si precipitated does not vary.

point bending flexural strength test at room temperature and 1000° C. based on JIS-R1601 was carried out. Furthermore, by a SEPB in the JIS-R1601, a breaking toughness value was sought. The results are shown in FIG. 1.

TABLE 1

| Sample No. | Composition (mol %) | | | | Firing temperature (° C.) | $Si/Si_3N_4$ Raman peak ratio | Strength (MPa) | | Toughness (Klc) $MPa \cdot m^{1/2}$ |
|---|---|---|---|---|---|---|---|---|---|
| | $Si_3N_4$ | Rare earth oxide | $SiO_2$ | $Al_2O_3$ | | | room temp. | 1000° C. | |
| *1 | 89 | $Y_2O_3$ | 1 | 7 | 3 | 1750 | 3.5 | 850 | 650 | 5.8 |
| 2 | 91 | $Y_2O_3$ | 2 | 4 | 3 | 1750 | 2.2 | 1040 | 850 | 6.3 |
| 3 | 91 | $Y_2O_3$ | 2 | 4 | 3 | 1800 | 2.1 | 1040 | 820 | 6.5 |
| *4 | 93 | $Y_2O_3$ | 3 | 1 | 3 | 1750 | 4.0 | 850 | 660 | 5.5 |
| 5 | 92 | $Y_2O_3$ | 3 | 2 | 3 | 1750 | 2.5 | 1070 | 820 | 6.5 |
| *6 | 90 | $Y_2O_3$ | 3 | 4 | 3 | 1650 | 0.1 | 920 | 670 | 5.3 |
| 7 | 90 | $Y_2O_3$ | 3 | 4 | 3 | 1700 | 0.8 | 1050 | 880 | 6.4 |
| 8 | 90 | $Y_2O_3$ | 3 | 4 | 3 | 1750 | 1.5 | 1000 | 910 | 6.8 |
| 9 | 90 | $Y_2O_3$ | 3 | 4 | 3 | 1800 | 1.9 | 1120 | 930 | 7.6 |
| *10 | 90 | $Y_2O_3$ | 3 | 4 | 3 | 1850 | 5.0 | 450 | 320 | 5.2 |
| *11 | 92.5 | $Y_2O_3$ | 3 | 4 | 0.5 | 1750 | 3.8 | 750 | 580 | 5.2 |
| 12 | 93 | $Y_2O_3$ | 3 | 4 | 1 | 1750 | 2.5 | 1050 | 840 | 6.3 |
| 13 | 89 | $Y_2O_3$ | 3 | 4 | 5 | 1750 | 0.7 | 1070 | 860 | 6.5 |
| *14 | 87 | $Y_2O_3$ | 3 | 4 | 6 | 1750 | 0.1 | 860 | 620 | 5.6 |
| 15 | 87 | $Y_2O_3$ | 3 | 5 | 3 | 1750 | 1.2 | 1090 | 910 | 6.9 |
| 16 | 87 | $Y_2O_3$ | 3 | 7 | 3 | 1750 | 0.8 | 1050 | 880 | 6.5 |
| *17 | 85 | $Y_2O_3$ | 3 | 9 | 3 | 1750 | 0.1 | 760 | 590 | 5.4 |
| 18 | 89 | $Y_2O_3$ | 4 | 4 | 3 | 1750 | 1.3 | 1120 | 950 | 7.5 |
| 19 | 90 | $Y_2O_3$ | 5 | 2 | 3 | 1750 | 2.2 | 1050 | 860 | 6.4 |
| 20 | 86 | $Y_2O_3$ | 7 | 4 | 3 | 1750 | 1.1 | 1090 | 890 | 6.7 |
| *21 | 85 | $Y_2O_3$ | 9 | 3 | 3 | 1750 | 0.1 | 840 | 630 | 5.6 |
| 22 | 91 | $Yb_2O_3$ | 3 | 3 | 3 | 1750 | 1.5 | 1160 | 960 | 7.7 |
| 23 | 91 | $Er_2O_3$ | 3 | 3 | 3 | 1750 | 1.3 | 1110 | 970 | 7.6 |
| 24 | 91 | $Lu_2O_3$ | 3 | 3 | 3 | 1750 | 1.4 | 1130 | 950 | 7.3 |
| 25 | 91 | $Sm_2O_3$ | 3 | 3 | 3 | 1750 | 1.6 | 1120 | 980 | 7.4 |
| 26 | 91 | $Dy_2O_3$ | 3 | 3 | 3 | 1750 | 1.7 | 1130 | 960 | 7.6 |
| 27 | 91 | $Y_2O_3$ $Er_2O_3$ | 2 1 | 3 | 3 | 1750 | 1.5 | 1110 | 920 | 7.5 |

*marks show samples outside the range of this invention.

As shown above, it is possible to obtain a silicon nitride sintered body having excellent characteristics such as a strength at room temperature of at least 1000 MPa, a strength at 1000° C. of at least 800 MPa, and a toughness value (Klc) of at least 6 $MPa.m^{1/2}$

EXAMPLE 1

A silicon nitride powder (a BET specific surface area of 9 $m^2/g$, α rate of 98%, the amount of oxygen=1.2% by weight), a powder of various rare earth element oxides, a powder of various aluminum oxides, and silicon oxide powder were used, and they were mixed so that there was formed a composition shown in Table 1. The resulting mixture was molded in a mold at 1 $t/cm^2$.

As soon as the molded article prepared was accommodated in a firing pot made of silicon carbide, a mixed powder of $SiO_2$+Si (1:1 by mole) which corresponds to 5% based on the weight of the molded article (an amount of 5 g per liter of the inner capacity of the firing pot) was placed in the pot, and firing was performed according to the conditions shown in Table 1 under normal pressure for 5 hours.

With respect to the resulting sintered bodies, the ratio of the Si peak intensity $X_2$ at 521 $cm^{-1}$ to the $Si_3N_4$ peak intensity $X_1$ at 206 $cm^{-1}$ was calculated by Raman spectrochemical analysis method. With respect to sample No. 8, its Raman spectrochemical analysis chart was shown in FIG. 1.

The sintered body was polished and processed into a shape of 3×4×40 mm. With respect to this sample, a four- According to the results of Table 1, samples Nos. 6, 14, 17 and 21 having an intensity ratio by the Raman spectrochemical analysis of less than 0.2 had an insufficient improving effect of strength and toughness, and had low strength and toughness. Furthermore, samples Nos. 1, 4, 10 and 11 having an intensity ratio exceeding 3 according to the composition and firing conditions had low strength and toughness.

In contrast to these Comparative Examples, the samples of this invention which had an intensity ratio of 0.2 to 3 had excellent characteristics of a strength at room temperature of at least 1000 MPa, a strength at 1000° C. of at least 800 MPa and a toughness of at least 6 $MPa.m^{1/2}$. The samples having the above ratio of 1 to 2 showed a strength at room temperature of at least 1090 MPa, a strength at 1000° C. of at least 890 MPa and a toughness of at least 6.7 $MPa.m^{1/2}$.

EXAMPLE 2

Mixing the silicon nitride powder, the $Y_2O_3$ powder, the $Al_2O_3$ powder and the $SiO_2$ powder which are used in Example 1, the mixture containing 90 mole % of $Si_3N_4$, 3 mole % of $Y_2O_3$, 4 mole % of $SiO_2$, and 3 mole % of $Al_2O_3$ is obtained. To 100 parts by weight of the mixture, MgO, $WO_3$, $WSi_2$, $MoO_3$, CuO or FeO powder was mixed in the proportions shown in Table 2. The mixture was molded in a mold at 1 $t/cm^2$.

The prepared molded article was accommodated in a silicon carbide firing pot, and per liter of the inner capacity of the firing pot, 5 g of Si+SiO$_2$ powder (Si:Sio$_2$=1:1 by mole) was placed into the pot, and firing was performed in an atmosphere at a nitrogen pressure of 1 atm for 5 hours.

The resulting sintered body was evaluated in the same way as in Example 1. The results are shown in Table 2.

TABLE 2

| Sample No. | Other component (Note 1) parts by weight | | Si/Si$_3$N$_4$ Raman peak Intensity ratio | Strength (MPa) | | Toughness (Klc) (MPa.m$^{1/2}$) |
|---|---|---|---|---|---|---|
| | | | | at room temp. | 1000° C. | |
| 28 | MgO | 1 | 1.6 | 1160 | 870 | 6.8 |
| 29 | WO$_3$ | 1 | 1.7 | 1120 | 910 | 7.4 |
| 30 | WSi$_2$ | 1 | 1.6 | 1110 | 920 | 7.5 |
| 31 | MoO$_3$ | 1 | 1.6 | 1150 | 880 | 7.3 |
| 32 | CuO | 1 | 1.7 | 1140 | 870 | 7.6 |
| 33 | FeO | 1 | 1.6 | 1150 | 900 | 7.5 |

As is clear from the results of Table 2, when suitable amounts of MgO, WO$_3$, WSi$_2$, MoO$_3$, CuO or FeO were compounded, the same excellent characteristics could be obtained.

EXAMPLE 3

Mixing the silicon nitride powder, the Y$_2$O$_3$ powder, the Al$_2$O$_3$ powder, and the SiO$_2$ powder which are used in Example 1, a mixture containing 90 mole % of Si$_3$N$_4$, 3 mole % of Y$_2$O$_3$, 4 mole % of SiO$_2$ and 3 mole % of Al$_2$O$_3$ was obtained and the mixture was molded in a mold under 1 t/cm$^2$.

The prepared molded article was accommodated in a silicon carbide firing pot, and per liter of the inner capacity of the firing pot, 0 to 12 g of a Si+SiO$_2$ (Si:SiO$_2$=1:1 mole ratio) mixed powder was placed into the firing pot and firing was performed at 1750° C. under a nitrogen pressure of 1 atm. for 5 hours. The resulting sintered body was evaluated in the same way as in Example 1. The results are shown in Table 3.

TABLE 3

| Sample No. | Amount of Si + SiO$_2$ arranged in the firing pot (g/liter) | Si/Si$_3$N$_4$ Raman peak intensity ratio | Strength (MPa) | | Toughness (Klc) MPa.m$^{1/2}$ |
|---|---|---|---|---|---|
| | | | room temp. | 1000° C. | |
| *34 | 0 | 4.0 | 860 | 630 | 5.8 |
| *35 | 0.5 | 3.5 | 870 | 640 | 5.8 |
| 36 | 1.6 | 2.8 | 1090 | 890 | 6.4 |
| 37 | 3.0 | 2.0 | 1110 | 910 | 6.6 |
| 38 | 5.0 | 1.5 | 1090 | 910 | 6.8 (same sample 8) |
| 39 | 7.0 | 1.3 | 1080 | 880 | 6.6 |
| 40 | 9.0 | 0.8 | 1060 | 860 | 6.5 |
| *41 | 12.0 | 0.1 | 880 | 660 | 5.4 |

*mark shows a sample outside the present invention

From the results of Table 3, when Si+SiO$_2$ powder was not placed, the amount of Si precipitated under firing conditions at 1750° C. under 1 atm. could not be adjusted to a minor amount. When the amount placed was larger than 10 g/l, sinterability was not sufficient, and therefore the characteristics were deteriorated. Hence, it is seen that the placed amount of Si+Sio$_2$ was most preferably 1 to 10 g/liter in this invention.

We claim is:

1. A silicon nitride sintered body containing a β-silicon nitride crystal phase as a main crystal phase and containing at least a rare earth elemental component and an aluminum component in a grain boundary phase, wherein an intensity ratio (X$_2$/X$_1$) of an Si peak X$_2$ at 521 cm$^{-1}$ to a silicon nitride peak X$_1$ at 206 cm$^{-1}$, as detected by a Raman spectrochemical analysis method, is 0.2 to 3.

2. A silicon nitride sintered body of claim 1 which has a strength at room temperature of at least 1000 MPa, a strength at 1000° C. of at least 800 MPa and a breaking troughness value (Klc) of at least 6 MPa.m$^{1/2}$.

3. A silicon nitride sintered body of claim 1 which contains 2 to 8 mole % of a rare earth element calculated as an oxide and 1 to 5 mole % of aluminum calculated as an oxide.

4. A silicon nitride sintered body of claim 3 wherein an excessive amount of oxygen obtained by subtracting an amounts of oxygen contained in rare earth element oxides and Al$_2$O$_3$ from the total amount of oxygen is 2 to 8 mole % calculated as SiO$_2$.

* * * * *